J. W. NOWAK.
COMPENSATING GEAR.
APPLICATION FILED FEB. 23, 1915.
1,162,305.
Patented Nov. 30, 1915.
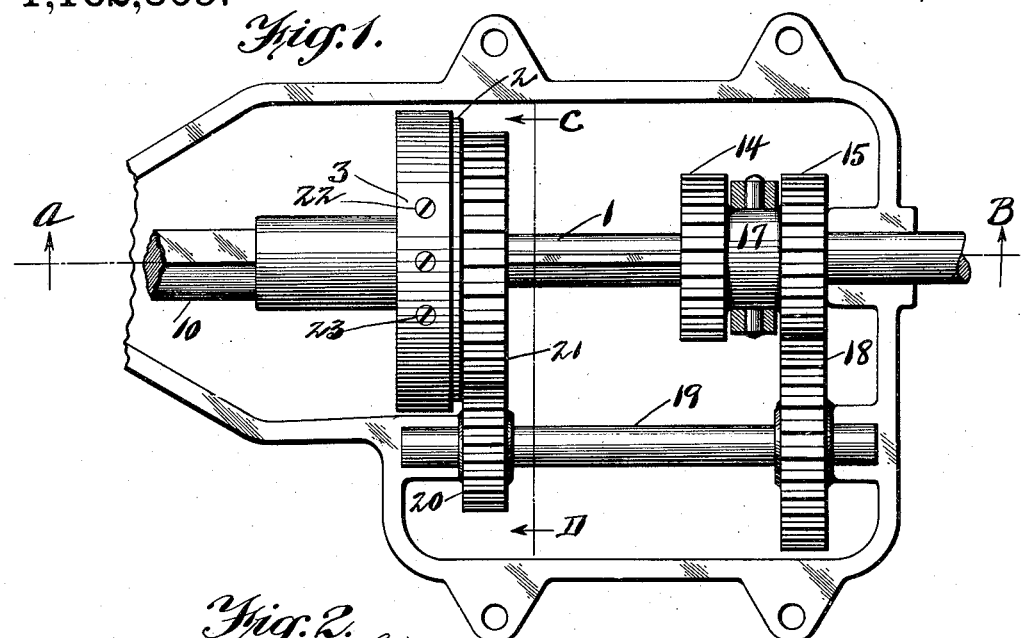
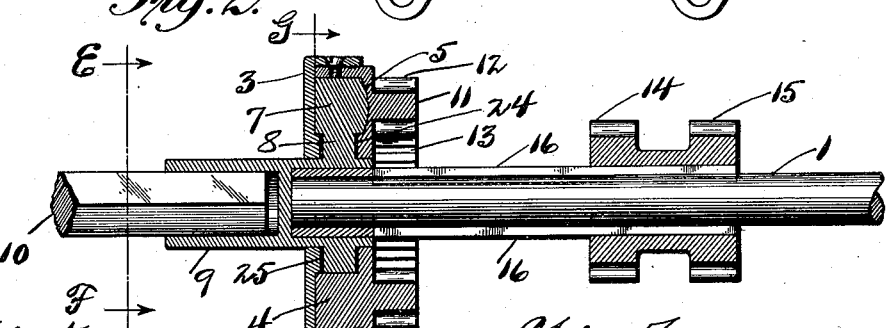
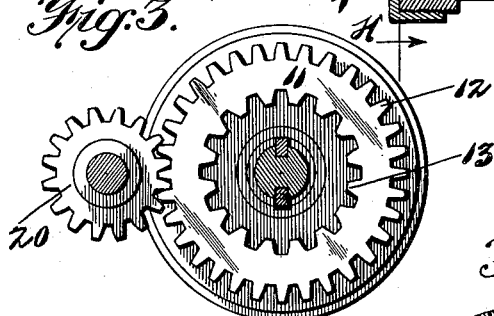
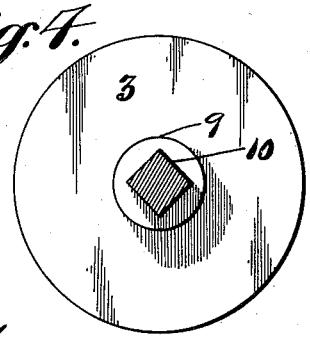
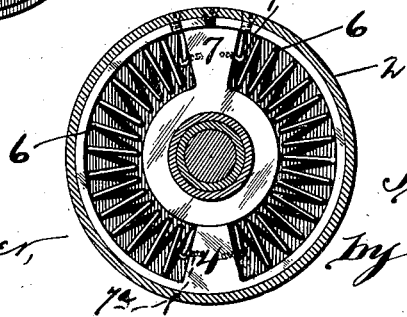
Attest:
Charles A. Becker,
A. B. Frey
Inventor
John W. Nowak,
By Small & Small
His Attorneys

UNITED STATES PATENT OFFICE.

JOHN W. NOWAK, OF ST. LOUIS, MISSOURI.

COMPENSATING GEAR.

1,162,305.  Specification of Letters Patent.  Patented Nov. 30, 1915.

Application filed February 23, 1915. Serial No. 9,971.

*To all whom it may concern:*

Be it known that I, JOHN W. NOWAK, a citizen of the United States, residing at St. Louis, in the State of Missouri, have invented a certain new and useful Improvement in Compensating Gears, of which the following is a specification.

This invention relates to improvements in compensating gears and has for its prime object the provision of a gear of the character described comprising devices for taking up the shock incident to shifting from low to high speed in power transmission apparatus.

Referring to the annexed drawing, wherein like numerals refer to like parts throughout the several views, Figure 1 is a top plan view; Fig. 2 a sectional elevation along line A—B of Fig. 1; Fig. 3 a detail view taken along line C—D of Fig. 1; Fig. 4 an end view taken along line E—F of Fig. 2; and Fig. 5 a detail view of the interior of the gear taken along line G—H of Fig. 2.

For purposes of illustration, I shall herein describe the use of my invention in connection with automobiles, but I do not propose to limit myself to such specific application and an understanding of the invention should make clear that the gear may readily be adapted for use in various kinds of machinery.

In the practice of my invention I dispose adjacent an extremity of the main drive shaft 1 of the automobile a hollow annular member 2 closed by a removable cap 3 and provided with an interior lug 4, as best depicted in Figs. 2 and 5. As indicated at 5 in Fig. 2, the floor or bottom of member 2 is dished in order to admit of the use of substantial helical springs 6 which are separated by stationary lug 4 and movable lug 7 projected from shoulder 8 formed upon sleeve 9 and connected to said lugs by screw-eyes 7$^a$, said sleeve incasing an extremity of shaft 1 and being apertured to receive an extremity 10 of the universal joint commonly employed in motor vehicles. Upon the outer surface of member 2 is formed or fixed a gear 11 having exterior teeth 12 and interior teeth 13, the latter being designed to mesh with clutch 14 which, together with gear 15, may be reciprocated upon shaft 1 by means of feathers 16 and shifter 17 which is operated through the well-known medium of a lever (not shown) extending upward through the floor of the car.

Coming now to the operation of the device and referring particularly to Fig. 1, it will be noted that the said view depicts the position of the gears of an automobile while the same is running at low speed, gear 15 driving the larger gear 18 which imparts motion through the agency of shaft 19 to gear 20, the latter serving to drive gear 21 at reduced speed relative to the movement of shaft 1. When it is desired to change from low to high speed, the shift lever is operated to disengage gears 15 and 18 while clutch 14 is thrown forward to mesh with teeth 13 of gear 11, and it is clear that the abrupt engagement of the parts last named imposes a severe strain on the transmission mechanism and an added burden upon the engine. The elimination of this strain and the lightening of this burden are prime objects of this invention and these desiderata are accomplished through the agency of springs 6, for when clutch 14 is brought into mesh with teeth 13 it results in the gradual compression of one of said springs (according as the machine may be moving forward or backward) between lugs 4 and 7 while the other thereof is expanded, so that the change from low to high speed is effected very gently. Moreover, to supplement the action of springs 6 and further perfect the desired cushioning effect, I partly fill the interior of member 2 with a lubricant injected through screw-closed ports 22 and 23, said lubricant being confined within said member by washers 24 and 25, and thus serving to yieldingly resist the movement of lug 7 when the same is actuated by the meshing of teeth 13 and clutch 14.

It will be appreciated that when the rear wheels of an automobile are lifted from the ground by encountering a rut or obstacle in the roadway during progress of the machine the revolutions of the drive shaft are momentarily increased due to the absence of a certain amount of friction, and that, therefore, when said wheels again contact with the ground a decided strain is abruptly imposed upon the driving mechanism. Hence, a further advantage results from the employment of my invention in such vehicles, for upon the rear wheels resuming contact with the roadway after having been jolted therefrom the ensuing strain upon the driving mechanism is completely absorbed by springs 6.

Having thus fully described my inven- tion, what I claim as new and desire to secure by Letters-Patent is:—

1. A device of the character described comprising a sleeve, a hollow annular member revolubly mounted adjacent an extremity thereof, a lug projecting from the inner surface of said member, a complemental lug projecting from said sleeve, springs disposed between said lugs, a revoluble shaft extending within said sleeve, a gear secured to the outer surface of said member, a clutch slidably mounted upon said shaft adapted to engage said gear, and means for operating said clutch.

2. A device of the character described comprising a sleeve, an annular shoulder formed thereupon, a hollow annular member revolubly mounted adjacent an extremity of said sleeve, a lug projecting from the inner surface of said member, a complemental lug projecting from said shoulder, springs disposed between said lugs, a revoluble shaft extending within said sleeve, a gear secured to the outer surface of said member, a clutch slidably mounted upon said shaft adapted to engage said gear, and means for operating said clutch.

3. A device of the character described comprising a sleeve, a hollow annular member revolubly mounted adjacent an extremity thereof, a lug projecting from the inner surface of said member, a complemental lug projecting from said sleeve, springs disposed between said lugs, means for retaining said lugs in alinement, a revoluble shaft extending within said sleeve, a gear secured to the outer surface of said member, a clutch slidably mounted upon said shaft adapted to engage said gear, and means for operating said clutch.

4. A device of the character described comprising a sleeve, a hollow annular member revolubly mounted adjacent an extremity thereof, a lug projecting from the inner surface of said member, a complemental lug projecting from said sleeve, springs disposed between and connected to said lugs, a revoluble shaft extending within said sleeve, a gear secured to the outer surface of said member, a clutch slidably mounted upon said shaft adapted to engage said gear, and means for operating said clutch.

JOHN W. NOWAK.

Witnesses:
W. F. SMALL,
W. KEENE SMALL.